(12) United States Patent
Bennett et al.

(10) Patent No.: US 11,779,844 B2
(45) Date of Patent: Oct. 10, 2023

(54) VIDEO GAME INVENTORY COACH

(71) Applicant: Sony Interactive Entertainment Inc., Tokyo (JP)

(72) Inventors: Matthew Bennett, San Mateo, CA (US); Peter Long, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 4 days.

(21) Appl. No.: 17/383,186

(22) Filed: Jul. 22, 2021

(65) Prior Publication Data

US 2023/0024836 A1    Jan. 26, 2023

(51) Int. Cl.
*A63F 13/5375* (2014.01)
*A63F 13/533* (2014.01)
*G06N 20/00* (2019.01)
*A63F 13/833* (2014.01)
*A63F 13/79* (2014.01)
*G06F 18/23* (2023.01)

(52) U.S. Cl.
CPC ........ *A63F 13/5375* (2014.09); *A63F 13/533* (2014.09); *A63F 13/79* (2014.09); *A63F 13/833* (2014.09); *G06F 18/23* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 2013/0059634 A1* | 3/2013 | Behmaram-Mosavat | ................... A63F 13/45 463/9 |
| 2016/0361651 A1* | 12/2016 | Yamashita | ............ A63F 13/533 |
| 2019/0201789 A1* | 7/2019 | Yang | ....................... A63F 13/67 |
| 2019/0329139 A1 | 10/2019 | Toledo et al. | |
| 2020/0139253 A1 | 5/2020 | Vennam et al. | |
| 2020/0269136 A1* | 8/2020 | Gurumurthy | .......... G06V 10/82 |
| 2020/0314498 A1 | 10/2020 | Viswanathan et al. | |
| 2020/0324206 A1 | 10/2020 | Yilmazcoban et al. | |
| 2021/0086089 A1 | 3/2021 | Pardeshi et al. | |
| 2021/0245061 A1* | 8/2021 | Kaushik | ................ A63F 13/798 |

OTHER PUBLICATIONS

"International Search Report and Written Opinion", dated Nov. 1, 2022, from the counterpart PCT application PCT/US22/73325.

* cited by examiner

*Primary Examiner* — Jason T Yen
(74) *Attorney, Agent, or Firm* — John L. Rogitz; John M. Rogitz

(57) ABSTRACT

A video game inventory coach AI model may suggest video game inventory items to discard, obtain, and/or use based on a user's gameplay style and clusters of other players. The inventory coach model may be turned on and off at a target player's discretion.

20 Claims, 9 Drawing Sheets

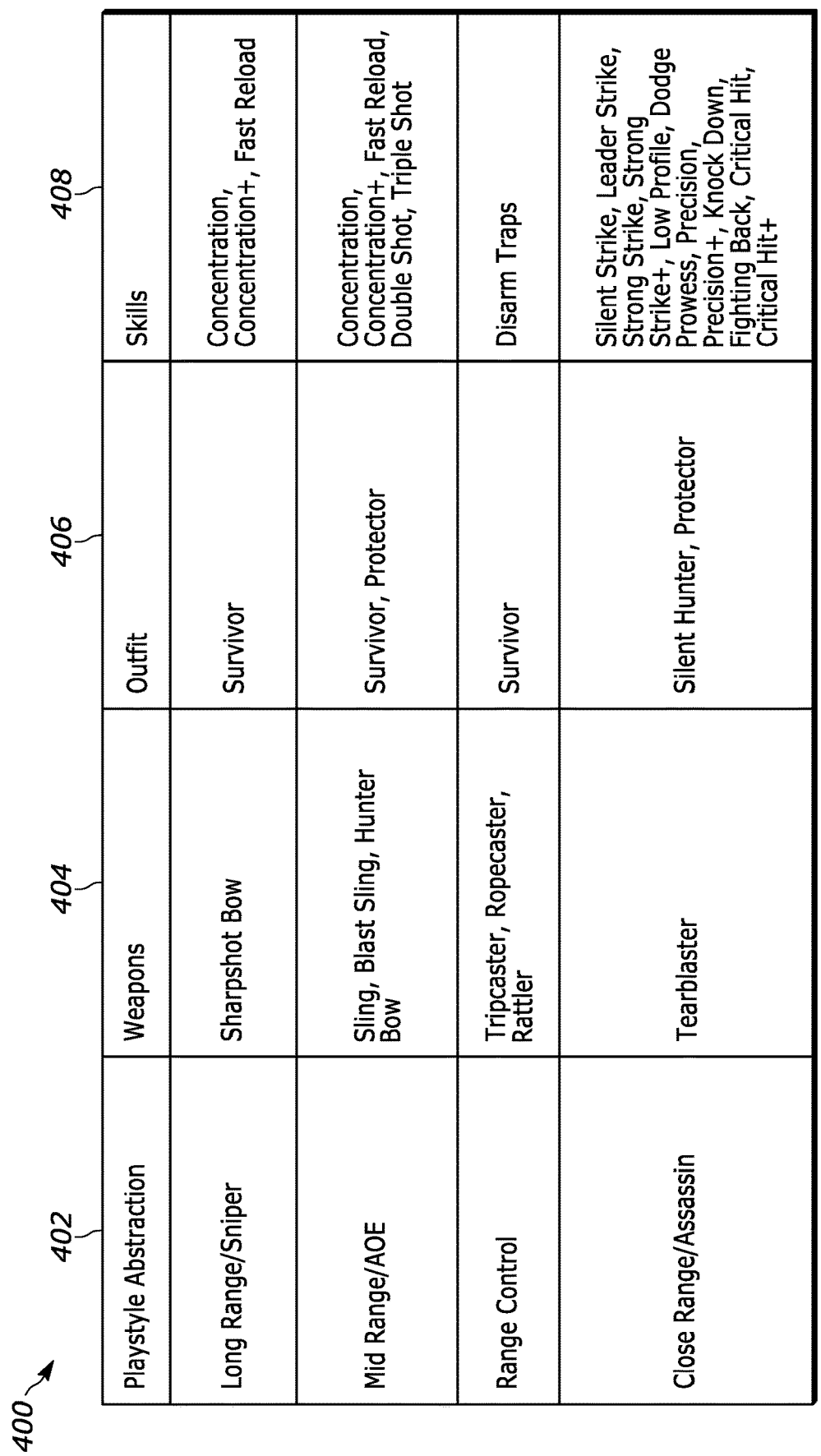

FIG. 4

| Playstyle Abstraction | Weapons | Outfit | Skills |
|---|---|---|---|
| Long Range/Sniper | Sharpshot Bow | Survivor | Concentration, Concentration+, Fast Reload |
| Mid Range/AOE | Sling, Blast Sling, Hunter Bow | Survivor, Protector | Concentration, Concentration+, Fast Reload, Double Shot, Triple Shot |
| Range Control | Tripcaster, Ropecaster, Rattler | Survivor | Disarm Traps |
| Close Range/Assassin | Tearblaster | Silent Hunter, Protector | Silent Strike, Leader Strike, Strong Strike, Strong Strike+, Low Profile, Dodge Prowess, Precision, Precision+, Knock Down, Fighting Back, Critical Hit, Critical Hit+ |

VIDEO GAME INVENTORY COACH

FIELD

The present application relates to technically inventive, non-routine solutions that are necessarily rooted in computer technology and that produce concrete technical improvements.

BACKGROUND

As understood herein, video game players are often limited to a certain number of virtual objects they can control at any one time while playing a video game, potentially missing out on other objects they might use or obtain. As also understood herein, a certain player might not even use various objects they have obtained but might hold on to them anyway based on the expectation of potential future use, even if they ultimately do not use those objects. This in turn leads to inefficient gameplay, holding on to objects that will not be used at the expense of other objects that might be used, duplicative or unnecessary actions, and an overall less than optimal experience, particularly for novice players.

SUMMARY

Accordingly, a video game inventory coach artificial intelligence (AI) model may be trained through machine learning to suggest video game inventory items to discard, obtain, and/or use based on a user's gameplay style, clusters of other players, and what point in the game the user has reached.

Thus, in one aspect a device includes at least one computer storage that is not a transitory signal and that includes instructions executable by at least one processor to analyze a video game player's playing style in relation to a particular video game that is being played by the video game player. The instructions are also executable to, based on the analysis, suggest at least one video game asset to discard, obtain, and/or use.

In some examples, the instructions may be executable to suggest at least one video game asset to discard based on the analysis, with the asset being held in the video game player's inventory for the particular video game. The instructions may also be executable to suggest at least one video game asset to obtain based on the analysis, with the asset not being currently held in the video game player's inventory for the particular video game and/or more of the asset being suggested to be obtained. Additionally, or alternatively, the instructions may be executable to suggest at least one video game asset to use based on the analysis, with the asset being held in the video game player's inventory for the particular video game.

If desired, the instructions may also be executable to use a machine learning-configured model and at least one reference player's data to make the suggestion, where the reference player is different from the video game player. In some examples, the at least one reference player's data may be assigned via the machine learning-configured model into a cluster defined by at least one common gameplay characteristic, with the at least one common gameplay characteristic also being identified as exhibited by the video game player while playing the particular video game.

In various examples, the asset itself may include one or more of a virtual weapon, virtual ammunition, virtual armor, a virtual craft, a virtual potion, a virtual plant, and/or a virtual skill.

Also in example embodiments, the analysis and suggestion may be performed by an inventory coach model executed through a video game console external to the video game environment itself. The inventory coach model may be configured to make video game asset suggestions for plural different video games, if desired.

Additionally, in some example implementations the instructions may be executable to analyze a video game player's playing style in relation to the particular video game at least in part by analyzing the video game player's combat style and/or at least one other gameplay habit of the video game player. Based on the analysis of the at least one gameplay habit and based on at least one portion of the video game that the user will play in the future, the instructions may then be executable to suggest the at least one video game asset to discard, obtain, and/or use.

In another aspect, a method includes analyzing, at a device, a video game player's gameplay in relation to a particular video game that is being played by the video game player. The method also includes, based on the analysis, suggesting at least one video game asset to discard, obtain, and/or use.

Thus, in some examples the analysis of the video game player's gameplay may include analysis of the video game player's combat style for engaging in video game combat. The video game player's combat style may be determined to be distance fighting and/or close-quarters combat.

Also in various example embodiments, the analysis may be executed using a video game console facilitating gameplay of the particular video game and using a remotely-located server that performs the analysis. Thus, the analyzing and suggesting may be performed by an inventory coach model executing at the server, with the server communicating with the video game console to present the suggestion via a graphical user interface that is presented external to the video game's environment. In some examples, the video game player may be a first video game player and the inventory coach model may be trained through machine learning to tailor suggestions of video game assets based on the learned habits of a threshold number of other video game players besides the first video game player. The other video game players may include, for example, at least a second video game player determined to have a gameplay style that matches the first video game player's gameplay style and at least a third video game player determined to have a gameplay style that does not necessarily match the first video game player's gameplay style.

In still another aspect, an assembly includes at least one computer comprising at least one processor programmed with instructions to identify a first video game player's collection of assets for a particular video game that is being played by the first video game player. The processor is also programmed to associate the first video game player with a cluster of other video game players and, based on the association, suggest at least one of the assets to discard and/or use.

In some examples, the processor may be programmed to associate the first video game player with the cluster based on the first video game player and members of the cluster having similar gameplay styles for playing the particular video game as determined by an inventory coach model.

The details of the present application, both as to its structure and operation, can best be understood in reference to the accompanying drawings, in which like reference numerals refer to like parts, and in which:

BRIEF DESCRIPTION OF THE DRAWINGS

FIG. 4 shows an example data table that may be used for making suggestions to a target player consistent with present principles;

DETAILED DESCRIPTION

Figure 1:
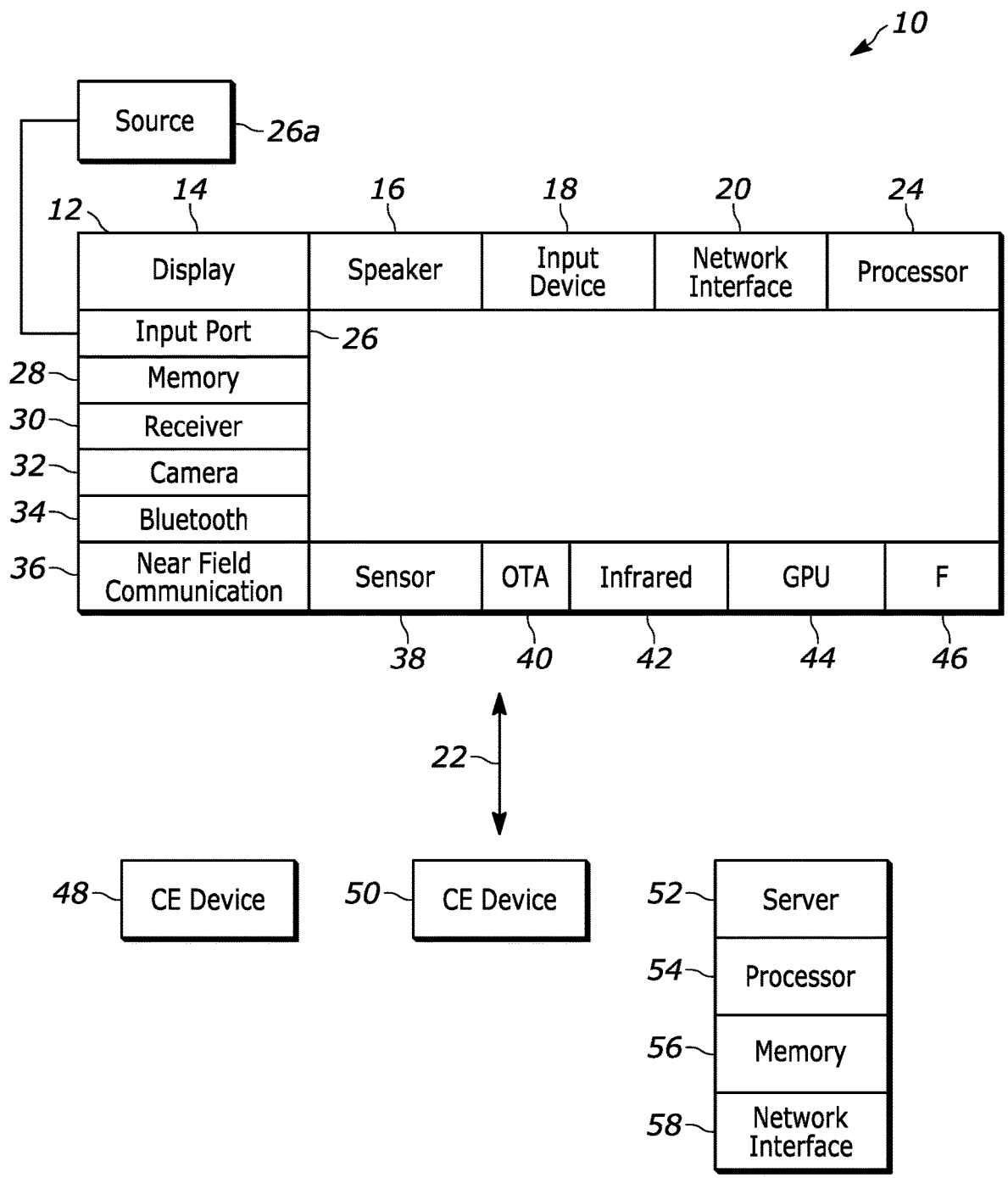
FIG. 1 is a block diagram of an example system of devices consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air (OTA) TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The techniques described herein may be embodied in a computer application ("app") downloaded from server storages on the Internet and stored on the implementing computer on any of the storages described herein. Additionally, or alternatively, the techniques may be implemented in whole or in part by a server remotely-located from a video game console that may also be used to implement some or all of the techniques.

With that in mind, the present detailed description recognizes that some video games provide a seemingly endless possibility of weapons, ammunition, and armor and other inventory items that might be collected and use. For instance, a game might allow a player to collect various plants, skins, potions, resources, and other assets/items used to craft supplies such as ammunition and weapon upgrades. However, the game might also restrict the amount of assets that can be held by the player's virtual character at any one time. Thus, consistent with present principles an inventory coach may work across all such games on various gaming platforms and guide the player as to when to get, sell, and/or drop various items/resources that the player may or may not need or find useful in the future depending on what part or stage of the game has been reached.

The inventory coach can also help determine if the player is using the best virtual weapon, ammunition, and/or armor for a certain game given the player's own playstyle. Thus, if a player has a habit of attacking or killing virtual enemies from a distance, the inventory coach may suggest ranged weapons such as a longbow or sniper rifle along with corresponding armor, if available according to the game. Likewise, if the player has a habit of close-quarters combat, the inventory coach may suggest a shotgun or sword along with appropriate armor.

The inventory coach may thus notify the player if the player is carrying too much extraneous virtual items around, e.g., for crafting and equipment upgrades, or if the player can potentially sell or discard some of those items without negatively affecting the player's prospects of game success. The inventory coach might also notify the player regarding whether the player is using the most appropriate weapons and armor from his/her inventory or other collection of assets given that player's particular gameplay style, and also notify the player regarding whether the player might want to obtain new or different items or skills for an enhanced, more-efficient gaming experience.

To accomplish the foregoing, the inventory coach may process telemetry data collected by the video game console or other computer, as might be stored remotely from the console on an Internet-based server, to determine the particular coaching suggestions to provide. The inventory coach may use machine learning (ML) to learn how other players have handled the same parts of the same game and cluster gamers together according to a similar playstyle. The coach may then then analyze which inventory items would help the player progress in the game more quickly. The coach might also look at inventory items and how much of each item might be needed for future upgrades or crafting based on the current playstyle and how far in the game the player has already advanced. For instance, if a player is carrying around an item that is deemed unnecessary because all upgrades have been achieved or the item will not be used for the remainder of the game, the coach may recommend selling or dropping that item.

In some example implementations, the inventory coach may be activated while in a specific game by exiting out to the shell interface for the console and starting/launching the coach, though in other situations the inventory coach may be activated directly from the game itself. If no game is currently active or launched at the player's console when the inventory coach is launched from the shell interface, the coach may present the player with a threshold number of most-recent games played (e.g., the most-recent three games played at that console) and ask the player to choose a game to select for inventory coaching for that game.

Figure 2:
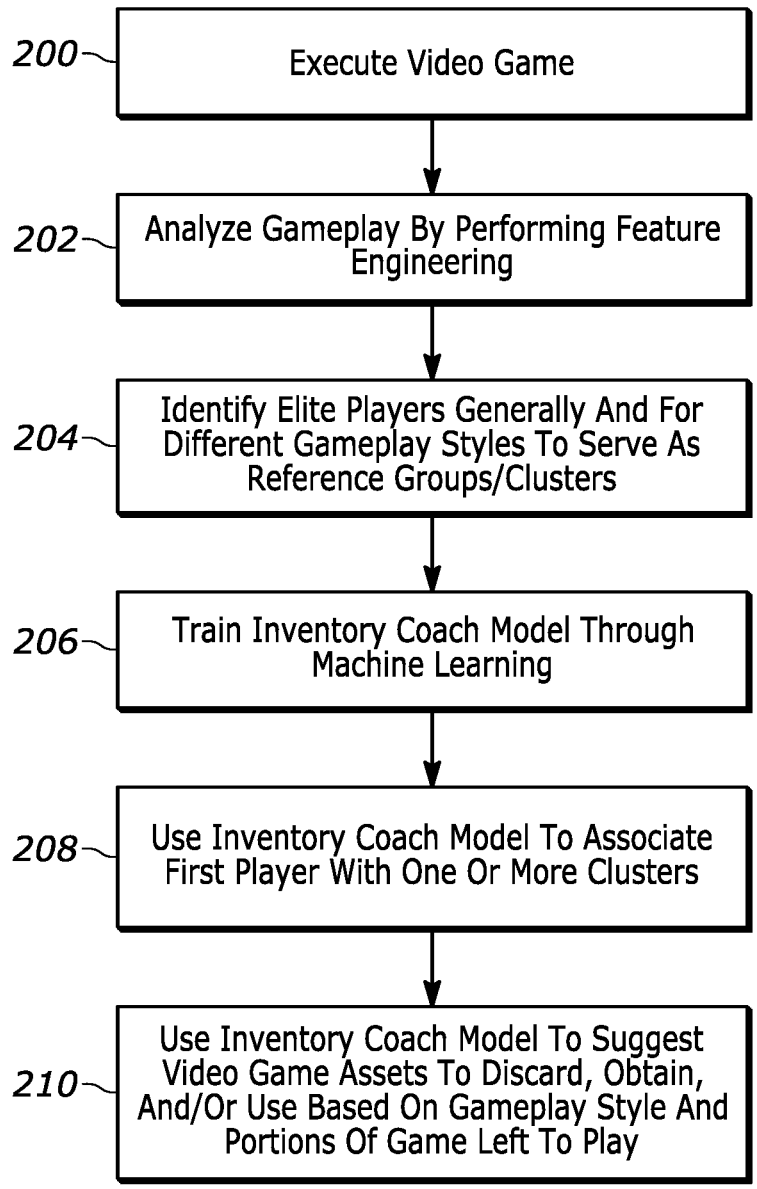
FIG. 2 illustrates example overall logic in example flow chart format consistent with present principles.

FIG. 2 illustrates overall logic consistent with the foregoing, where the logic may be executed by one or more devices such as a personal computer, video game console, and/or remotely-located server in any appropriate combination. Beginning at block 200, the device may execute the video game itself and facilitate gameplay. The logic may then proceed to block 202 where the device may analyze a particular player's gameplay, e.g., by performing feature engineering to identify certain habits/preferences of the player. The particular player will be described below in reference to FIG. 2 as a "first player", with it being understood that the first player might but does not necessarily need to be a novice or casual gamer.

From block 202 the logic may then proceed to block 204 where the device may identify elite players who play the same video game exceptionally well, as may be determined based on quantifiable metrics established by the game's developer or console manufacturer. The metrics might include, in any appropriate combination, success (or failure), most points scored, least amount of time to complete a level or the game itself, most virtual characters killed, most virtual currency acquired, etc. In some examples, the elite players may be identified and grouped according to overall performance regardless of gameplay style. Additionally, or alternatively, the elite players may be identified and grouped according to performance using a given gameplay style. Elite players generally and elite players per playstyle may then serve as reference groups or clusters for purposes that will be described further below.

But first, note that the logic of FIG. 2 may next proceed from block 204 to block 206. At block 206 the device may train an inventory coach artificial intelligence (AI) model through various machine learning techniques to infer as output one or more game performance metrics for a given set of inputs for an elite player, where the inputs may include usage of certain game assets (e.g., virtual items and/or game skills) in isolation and/or in combination with each other, and possibly at certain specific points within the game. Outputs may also include overall gameplay style. The output and the insights derived from the correlation between the model's input and output may thus be used, during deployment, to make certain asset suggestions to a given player of the game, including the first player. Outputs that might be used for training may include various gameplay styles, and/or various metrics that indicate success or failure generally (or one or more of the specific quantifiable metrics from above), at a certain aspect or point of the game and/or overall, as associated with use of a given set of assets that establish a corresponding training input.

Thus, present principles may employ various machine learning models, including deep learning models. Machine learning models consistent with present principles may use various algorithms trained in ways that include supervised learning, unsupervised learning, semi-supervised learning, reinforcement learning, feature learning, self learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Then once the inventory coach model is trained (or further trained as more data on the elite players becomes available), the logic may then proceed to block 208 where the device may use the trained inventory coach model to associate the first player with one or more of the clusters of other players per block 204, including a cluster of elite players who share one or more identified gameplay styles that are the same or similar to the first player. Thereafter the logic may proceed to block 210.

At block 210 the inventory coach model may suggest, based on the general success of elite players regardless of gameplay style and/or based on the first player's own gameplay style being matched to a particular cluster, one or more assets for the video game that can be discarded, might be obtained, and/or might be used even if already in the first player's inventory. In some examples, the suggestions may also be tailored based on the remaining portions of the game left to play that the user has not beat yet so that items that might otherwise be useful according to the first player's gameplay style but would only be useful for past aspects of the game that have already been played are omitted.

Figure 3:
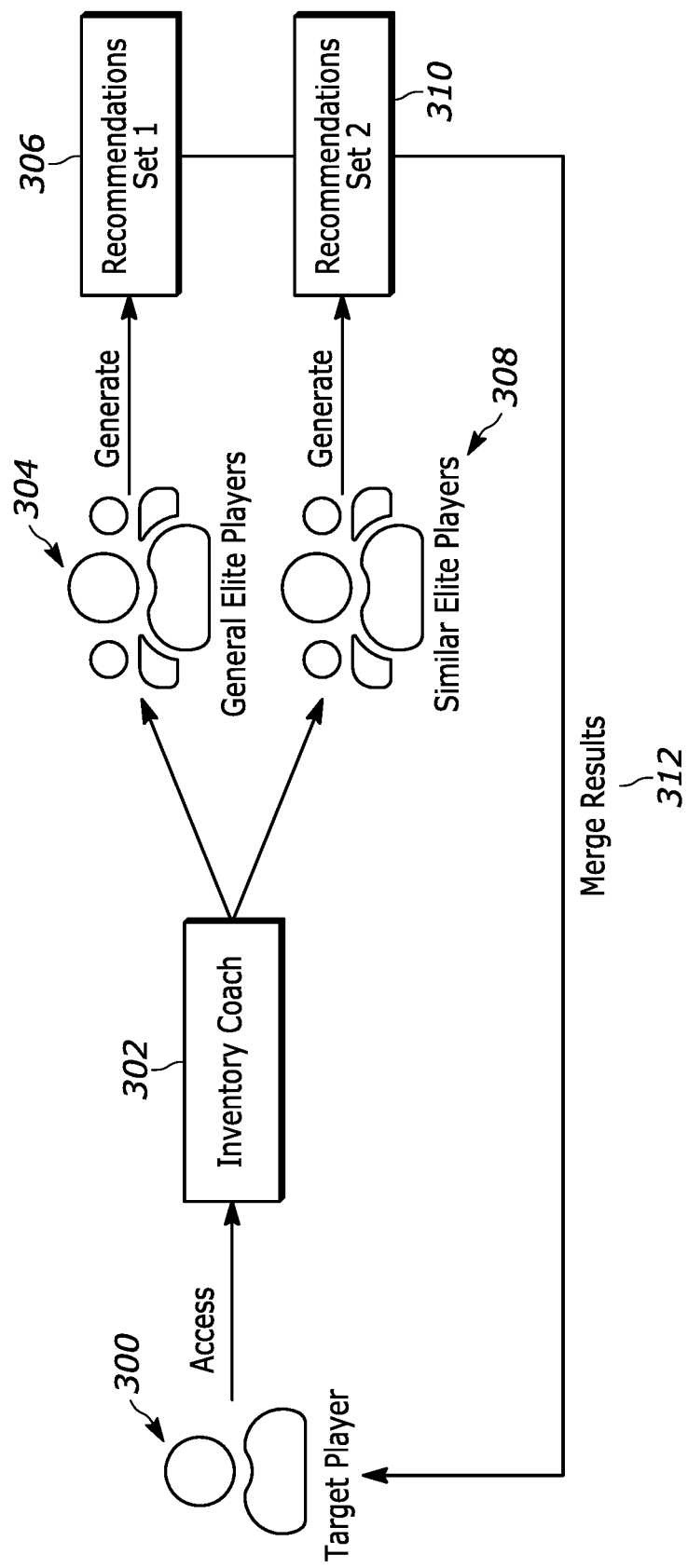
FIG. 3 shows an example schematic diagram illustrating a process for employing various player clusters to make suggestions to a target player consistent with present principles.

FIG. 3 shows a schematic diagram illustrating a process that may be used with the logic of FIG. 2 for employing various player clusters to make suggestions to the first player. The first player from FIG. 2 is generally designated as a target player 300 in FIG. 3, with the target player's console or computer having access to an inventory coach model 302 as described herein. The model 302 itself may group general elite players regardless of gameplay style into a first cluster 304 for which one or more recommendations 306 to the target player 300 may be made based on the overall gameplay and outcomes of that cluster (cluster 304). The model 302 may also group elite players with a similar gameplay style as the target player 300 into a second cluster 308 for which one or more recommendations 310 to the target player 300 may be made based on the gameplay and outcomes of that cluster (cluster 308). Note that a given elite player may be associated with both of the clusters 304, 308 in some embodiments if that reference player is both a general elite player and an elite player of the same gameplay style as the target player 300. In any case, note that merged results 312 may ultimately be presented to the target player 300 consistent with the present description.

Thus, the inventory coach model 302 may compute player clusters based on in-game data collected by the respective consoles of the elite reference players as reported to a server associated with the manufacturer of the consoles. Feature engineering for each elite reference player may thus be performed at the server using the respective in-game data for that respective reference player to extract useful features/learn player habits. Methods/models that may be used for feature engineering include transformer networks such as BERT, RoBERTa, XLM-RoBERTa, etc. and feature engineering techniques such as transformation, binning, scaling, projection, etc. Clustering algorithms may then be applied to extracted features, where methods/models for such clustering may include clustering algorithms such as K-means Clustering and Hierarchical Clustering. Note that similar methods and models may also ultimately be used for feature engineering and clustering in relation to the gameplay of the target player 300 as well.

As for the elite players that are identified to serve in the reference groups/clusters 304, 308 themselves, design metrics may be used that quantify a reference player's game performance to thus identify the elite players from a broader set of players for which telemetry data has been reported. The metrics may be an aggregation of data such as activity success ratio, time consumption, scores/ratings, etc. The players may thus be sorted by the game performance metrics and a threshold top percentage or number of players may be used as a given reference group/cluster qualification (such as the top ten percent or the top one hundred players). The server or other computer processing the in-game data for the reference players may then create one general reference group from the whole player population (e.g., different players of different gameplay styles grouped together) and also create a cluster-specific/gameplay style-specific reference group based on learned gameplay habits.

These two clusters may then be used to generate recommendations to the target player 300 on inventory resource management. This may be done by the server or other computer first comparing resource distributions to detect meaningful discrepancies. For example, the target player may currently have many "small potions", "cleansed water", and "bamboo" in his/her personal player inventory, but the general reference group and/or gameplay style-specific reference group to which the target player 300 has been assigned are recognized as tending to not to have any of those items.

After comparing resource distributions to detect meaningful discrepancies, the server or other computer may then examine inventory management actions taken by the reference players of the reference groups/clusters. For example, players of one or more of the reference clusters might have crafted "small potions" and "cleansed water" into "large potions" while also dropping all "bamboo". Thereafter, the server may construct meaningful recommendations from the information extracted above, e.g., provide a suggestion to either discard those items from the inventory of the target player 300 or convert certain ones into a "large potion" similar to how the reference player(s) did.

Recommendations may also be generated on equipable items and skills. This may be done by the console developer, a system administrator, or other technician building one or more interpretable regression models between item/skill usages and the game performance metrics to identify items and item combinations for suggestion that are likely to boost one's game performance (e.g., the performance of the target player 300). Methods/models that may be used include generalized linear models and tree-based models such as Random Forest and XGBoost. For training such models and also for deployment, the inputs for the model structure may be usage of various items/skills and their usages in various combinations (expressed as interaction terms). The outputs may then be game performance metrics, where during the training phase(s)) the outputs may be labeled as "good", "bad", and "elite/exceptional" gameplay, or using other label designations as desired (e.g., where supervised machine learning is employed).

Thus, when a target player accesses the inventory coach model per the description of FIG. 7 below or by other means, the player's current state of inventory management can be compared with the actions taken by those reference players who have proven to excel in the game at a similar time (e.g., in terms of game progress). Recommendations may be created based on two groups of players: the general elite players 304 who have the best performance in the game overall even if not necessarily using the same gameplay style, and the high-performing players 308 who are algorithmically determined to be similar in gameplay style to the target player 300.

By using two reference player groups, one of which is not gameplay style-specific, the recommendations/suggestions made to the target player 300 by the inventory coach model may be diversified and personalized. Thus, in addition to providing general recommendations that would help the player to optimize his/her existing resources and to attain useful resources moving forward (e.g., using the generalized cluster 304), personalized recommendations by gameplay style can also be provided based on the target player's experience in the game so far.

Note that from a game design perspective, the resources/assets available in a game may have unique interactive dynamics, and so the optimization of resources/assets for a given target player may be dependent on the player's gameplay style in that game. For example, in an action-adventure game, players who like to engage in melee combats may receive suggestions to equip themselves with items and skills that maximize close-range damage output and defense. On the other hand, players who enjoy long-range combat may benefit more from long-range weapons and skills. The table 400 of FIG. 4 provides examples of such assets according to gameplay style.

As shown in FIG. 4, an example data table 400 is shown that may also be used in conjunction with the logic of FIG. 2. The table 400 may be built based on empirical data of various traits of elite reference players by game or console developers, and/or may be populated by an inventory coach model as described herein based on identified elite reference player actions and/or "good" action inferences made using one or more of the models discussed herein. The table 400 may therefore be used to make suggestions to a target player, such as the player 300, as appropriate.

As shown in FIG. 4, a first column 402 may indicate a gameplay style, designated in FIG. 4 as "playstyle abstraction". Again, note that gameplay style may be determined as discussed herein, e.g., using feature engineering and clustering to assign a given player to a certain cluster specific to a certain gameplay style.

As also shown in FIG. 4, once a particular gameplay style for a target player has been inferred, data in column 404 for the respective gameplay style may be accessed to identify weapons that may be suggested to the target player to acquire or to use (e.g., if already in the target player's inventory). Data in column 406 may also be accessed for the respective gameplay style to identify outfits and/or armor that may be suggested to the target player to acquire or to wear if already in the target player's inventory. Similarly, data in column 408 may be accessed for the respective gameplay style to identify skills that may be suggested to the target player to acquire or to use if already in the target player's inventory. Note that the particular data shown in FIG. 4 is presented by way of example and is not intended to be limiting.

Figure 5:
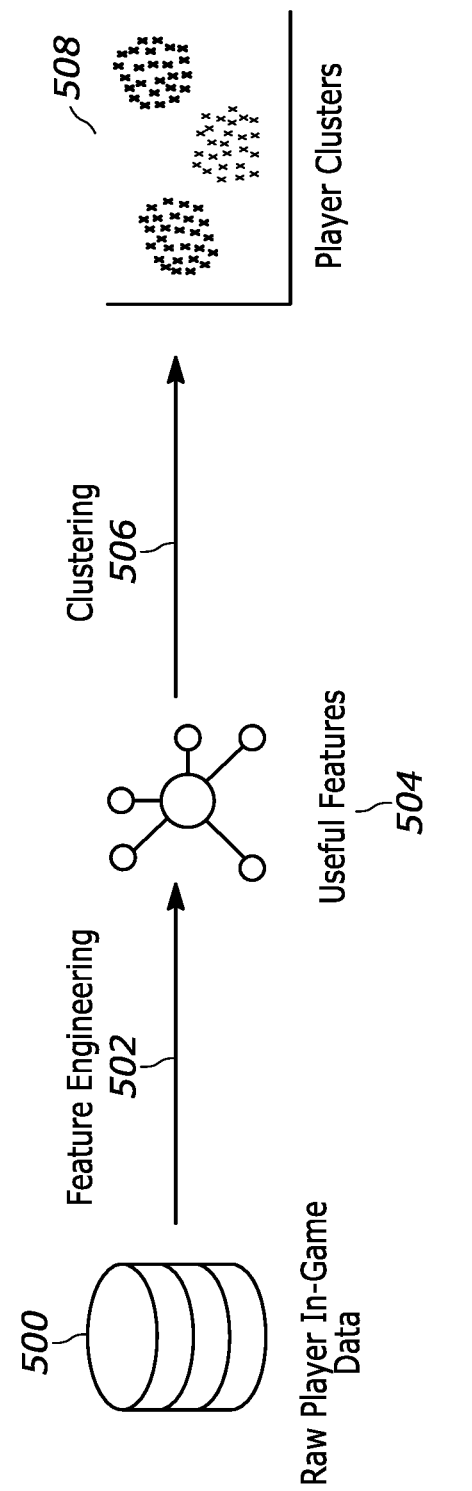
FIG. 5 shows an example schematic diagram of feature engineering and clustering as performed based on a particular target player's raw in-game data consistent with present principles.

FIG. 5 shows another schematic diagram of a process that may be executed by an inventory coach model consistent with present principles. As shown, raw in-game data 500 for a particular player may be processed using feature engineering 502 to identify useful features 504. The raw in-game data 500 may be generated by video game telemetry, as may be collected or generated by the target player's local video game console/computer executing the video game based on controller inputs, outputs from the video game app itself as the target player progresses through a given video game, and so on. The controller inputs may include, for example, gaming moves, inputs to switch weapons in an inventory cache, weapons and ammo used against a foe with resulting damage, armor worn, and damage taken per hit by a foe, etc. The raw in-game data may then be reported to a server or other computer employing an inventory coach model consistent with present principles.

Once useful features 504 have been identified, clustering algorithms 506 may be executed in order to assign the target player into one or more player clusters 508 including clusters matching the target player's gameplay style. Note here that in some examples, the target player may be assigned to more than one gameplay style-specific cluster if more than one gameplay style is determined for the target player.

Figure 6:
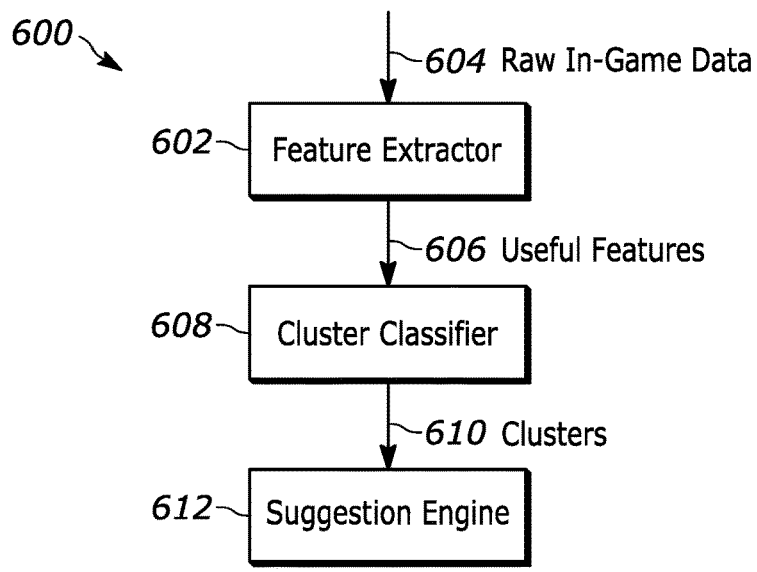
FIG. 6 shows example artificial intelligence (AI) architecture that may be used for an inventory coach consistent with present principles.

Now in reference to FIG. 6, example artificial intelligence (AI) architecture 600 for an inventory coach model is shown. As shown, the architecture 600 may include a feature extractor 602 that may perform feature engineering using raw in-game data 604 as input as described herein. Output 606 of useful features may then be provided to cluster classifier 608 as input for the classifier 608 to use clustering algorithms on the extracted features 606 to provide as output 610 one or more clusters determined from the useful features 606. Suggestion engine 612 may then take the output 610 from the cluster classifier 608 as input to identify one or more suggestions to make to the target player to which the raw in-game data 604 pertains, e.g., using a table like the table 400 of FIG. 4.

Thus, by using the various logic, methods, table, and architecture above, recommendations or suggestions may be provided to a given target player using performance by other reference players who have the most success historically regardless of gameplay style and/or have the most success using a similar gameplay style. The suggestions may be in relation to optimizing existing resources as already currently available in the player's game inventory. Resources may include manageable items, abilities, skills, etc. Optimizations may include equipping, selling, crafting, modifying, and/or dropping items. The suggestions may also be in the form of suggestions of attainable resources/assets, where attainability might further depend on the player's current game level, money, location, etc. so that only assets available at a given level of the game are suggested, only assets the player can afford with the current amount of virtual currency available to the player are suggested, and/or only assets the player can obtain (or obtain more of) or discard at a given geolocation in the game's virtual world are suggested.

Recommendations and suggestions may thus be made based the player's current progress in the game (e.g., character level, game progress, timestamp, etc.). Resource optimization can therefore help significantly improve a player's gaming performance, with the inventory coach model itself providing players an easy access to resource optimization help.

Figure 7:
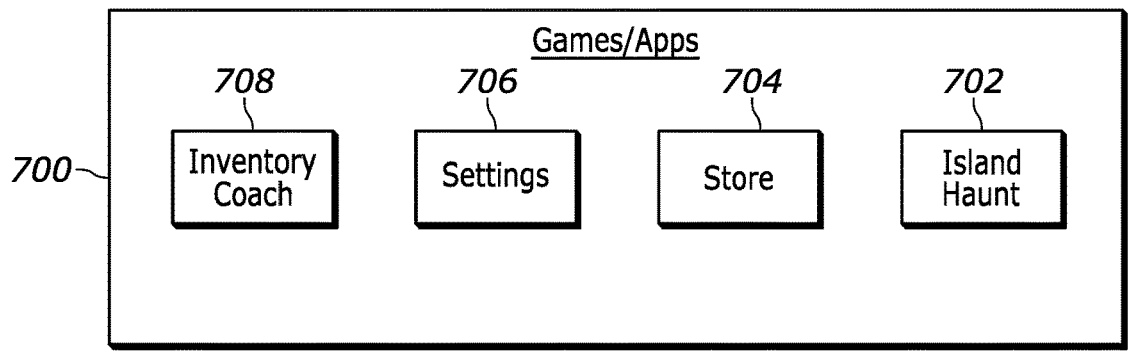
FIG. 7 shows an example shell graphical user interface (GUI) that may be controlled to access an inventory coach consistent with present principles.

FIG. 7 shows an example dialog in a graphical user interface (GUI) 700 that may be presented on a display under control of a video game console or other computer to control aspects of the console/computer's operating system (OS) and access to certain functions at the OS level external to a certain video game environment itself. The GUI 700 may be reached by pressing a certain designated button on a keyboard, mouse, video game controller, joystick, etc. that might be used for gaming and/or controlling the console. As shown, various selectable "apps" may be presented including an app 702 that is selectable to initiate a particular video game with the fictional title "Island Haunt". An online store app 704 may also be selected to launch an online marketplace from which other video games may be purchased and downloaded, as well as a settings app 706 that may be selected to launch a settings application through which more or more settings of the console may be configured. For example, the app 706 may be selected to command the console to present the GUI 1200 of FIG. 12, which will be described later.

As also shown in FIG. 7, the GUI 700 may include an inventory coach app 708 that may embody the inventory coach model(s) described above. In situations where no game is currently active and being executed at the console, selection of the app 708 may cause the GUI 800 of FIG. 8 to be presented. However, in situations where a particular video game is currently active and the player may have paused it in order to go to the GUI 700, selection of the app 708 may cause the console to go directly to presenting the GUI 900 of FIG. 9 as will be described shortly.

Figure 8:
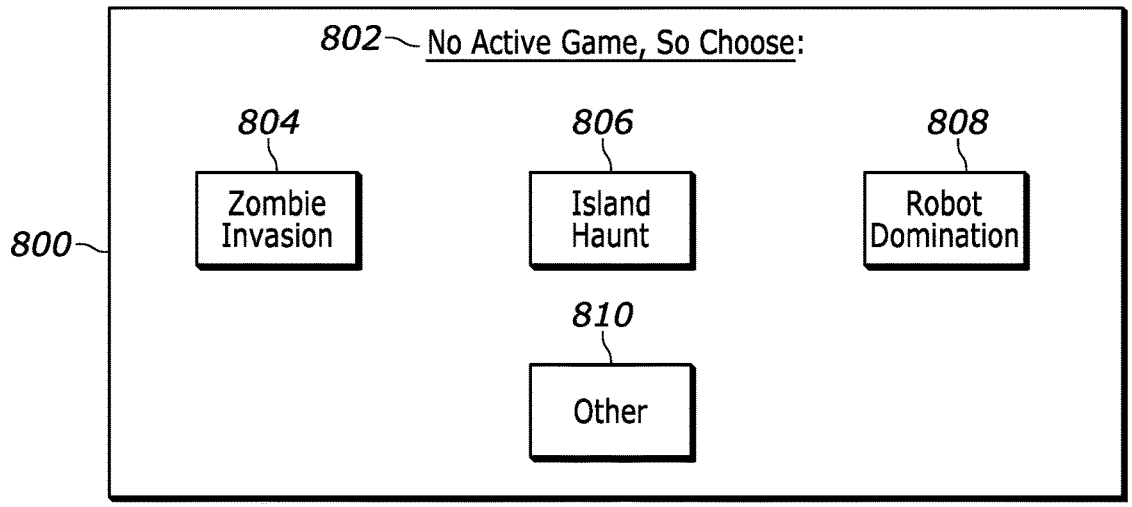
FIG. 8 shows an example GUI from which a particular video game may be selected to receive inventory coach suggestions consistent with present principles.

But first, in reference to FIG. 8 note that the GUI 800 that is shown may include an indication 802 that no video game is currently active. The GUI 800 may also list various selectable video game apps 804-808 that may be selected, which in turn may cause another GUI like the GUI 900 of FIG. 9 to be presented for that respective video game (but possibly still external to the video game's own environment) to provide inventory coach suggestions to the player regarding the particular video game associated with whatever app is selected from among the selectors 804-808. And even though no game might be currently active in some situations, the inventory coach may still provide suggestions based on the user's previous gameplay and gamestate for the selected game as saved manually or automatically prior to a most-recent shutdown or closing of the respective video game app itself. Also note that should the player wish to receive inventory coaching on a game that is not one of the most-recently executed three that are listed, the player may browse to the desired game from the player's library of games by selecting the other selector 810.

Thus, after exiting out to the shell interface 700 and starting the inventory coach, the player may be able to access the various suggestions for one or more video games. Generally, in some examples suggestions may be provided separately for different clusters. For example, the suggestions might be that elite players who excel in the game generally tend to take actions A, B, and C, while elite players who play similarly to the target player tend to take actions D, E, and F.

Figure 9:
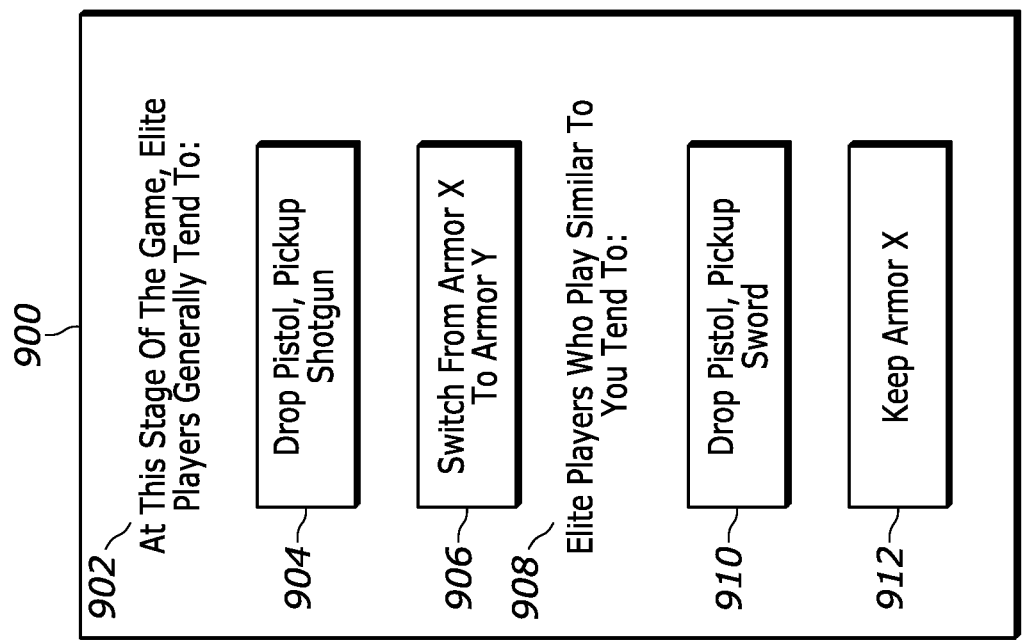
FIGS. 9-11 show various example GUIs that may be presented for an inventory coach to provide suggestions to a target player consistent with present principles.

A more specific example in accordance with the foregoing is shown in FIG. 9, where a GUI 900 for the inventory coach may be presented on a display controlled by a console or other computer being used for gaming. Again, note that the GUI 900 may be reached automatically responsive to selection of the coach app 708 if the game is already executing and has current gamestate data maintained in RAM, whereas the GUI 900 may be reached by selecting a respective app from the GUI 800 if no game is currently executing and maintained in RAM.

In either case, the GUI 900 may be presented and, as shown in FIG. 9, include an indication 902 that at the particular stage of the game at which the target player is currently, overall elite players regardless of gameplay style tend to drop a pistol and pick up a shotgun (suggestion 904), and/or switch from armor X to armor Y (suggestion 906). Note that each of the suggestions 904, 906 in this example is established by a selectable button or other type of selector that is selectable to provide a command to the game itself to perform the suggested action. Thus, selection of the selector 906 may command the game to drop a pistol currently held by the target player's virtual character (if actually being held already) and/or select a shotgun already in the target player's inventory. Likewise, selection of the selector 908 may command the game to take armor X off the player's virtual character (if already being worn) and/or place armor Y on the player's virtual character.

As also shown in FIG. 9, the GUI 900 may also include an indication 908 that at the particular stage of the game at which the target player is currently, elite players of the same gameplay style as the target player tend to drop a pistol and pick up a sword (suggestion 910), and/or put on or continue using armor X (suggestion 912). Note that here too each of the suggestions 910, 912 may be selected to provide a command for the game to execute the associated action (e.g., pick up a sword per suggestion 910 or put on/continue using armor X per suggestion 912).

Figure 10:
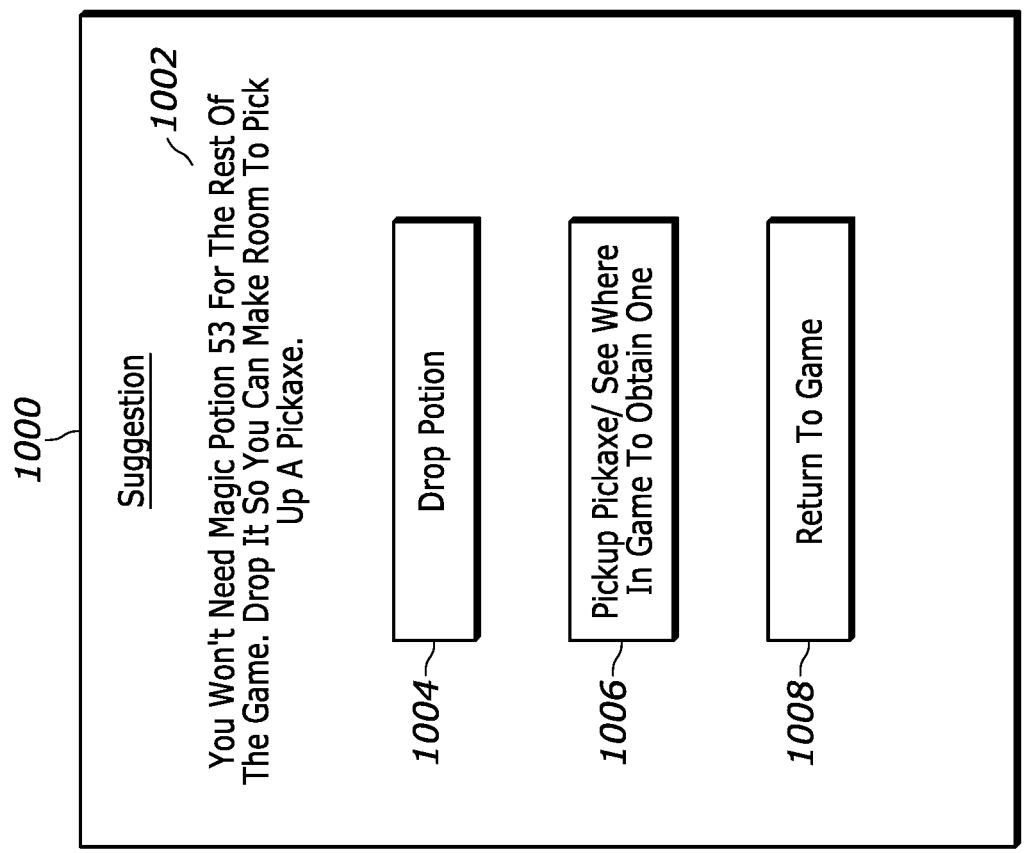

FIG. 10 shows another GUI 1000 that may be presented as part of an inventory coach for providing suggestions to a target player. An indication 1002 including a suggestion is shown that, based on the target player's current progress to a certain level of a certain video game, the player will not need "magic potion 53" for the rest of the game. This suggestion might be made by the inventory coach based on a determination that, for example, the player has already beaten the specific level of the game that uses "magic potion 53" and that it will not be useful during subsequent levels of the game. Thus, the indication 1002 may suggest that the target player's virtual character discard it to make room in the player's limited inventory to pick up a weapon the player may find useful based on the player's gameplay style. Note that suggestions are not broken down between elite players generally and elite players of a certain gameplay style in this example since, e.g., the suggestions would be the same in either case.

In any case, note that selector 1004 may be selected by the target player to provide a command to the game for the player's virtual character to drop or discard "magic potion 53" from the player's available inventory. Selector 1006 may be selected to provide a command for the player's virtual character to pick up a pickaxe, assuming one is nearby or immediately ready for pick up, or to present a virtual map of the gameworld that indicates a virtual location at which the pickaxe may be located so that the player can see where the player should navigate his/her virtual character in order to obtain the pickaxe. Additionally, if the player does not wish to provide either command, selector 1008 may be selected to simply return to the game where the player left off when invoking the inventory coach.

Figure 11:
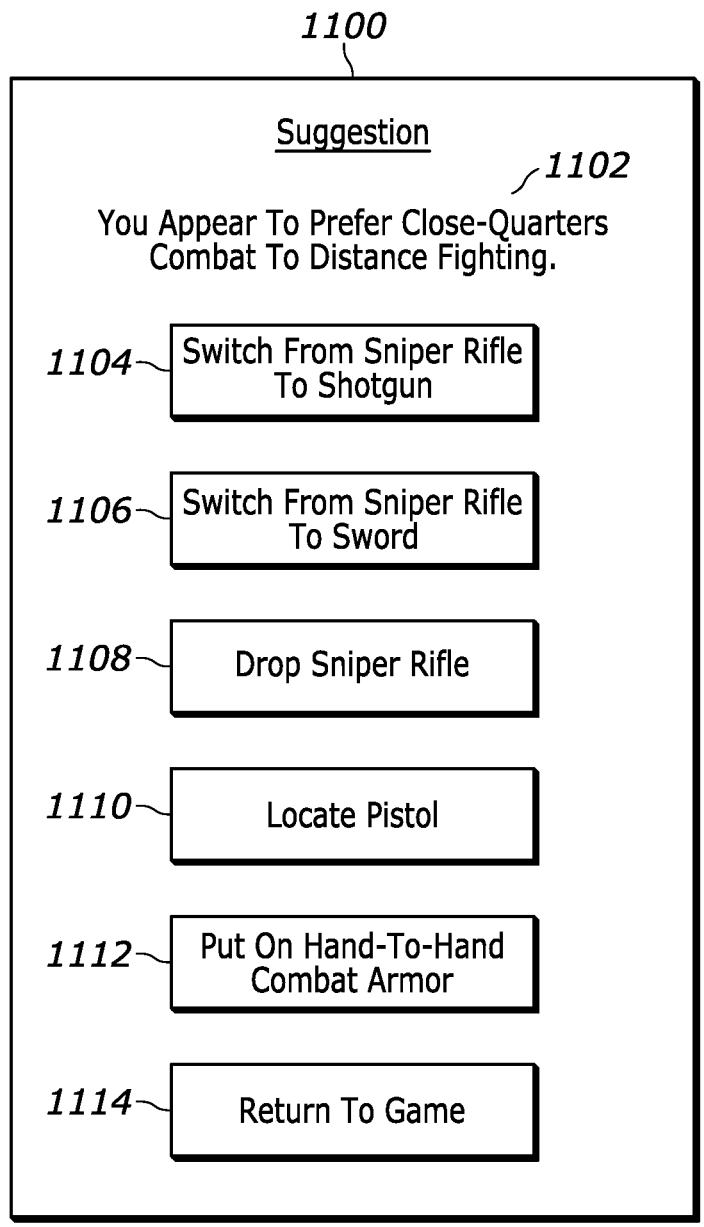

FIG. 11 shows yet another GUI 1100 that may be presented on a display as part of an inventory coach for providing suggestions to a target player. An indication 1102 including a suggestion is shown that, based on the target player's identified gameplay style, the player appears to prefer close-quarters combat to distance fighting. Note that in this example ensuing suggestions are again not broken down between elite players generally and elite players of a certain gameplay style since, e.g., the suggestions are all specific to the target player's specific gameplay style.

As shown in FIG. 11, each of the specific suggestions may be presented in the form of a respective selector 1104-1114 that may be selectable to provide a command to the game in accordance with the text suggestion presented on the face of the respective selector itself. As examples, the suggestions may include switching from a sniper rifle that might better for distance fighting to a shotgun that might be better for close-quarters combat (selector 1104). For similar reasons, selector 1106 may be selected to switch from using a sniper rifle to using a sword. Likewise, selector 1108 may be selected to provide a command to the target player's virtual character to drop a sniper rifle, while selector 1110 may be selected to command the game to present a map or other data from which the player can locate a pistol for close-quarters combat. If desired, the player might also select the selector 1112 to command the player's virtual character to put on armor suitable for hand-to-hand combat, while selector 1114 may be selected to simply return to the game itself if the user does not wish to select any of the other selectors 1104-1112.

Figure 12:
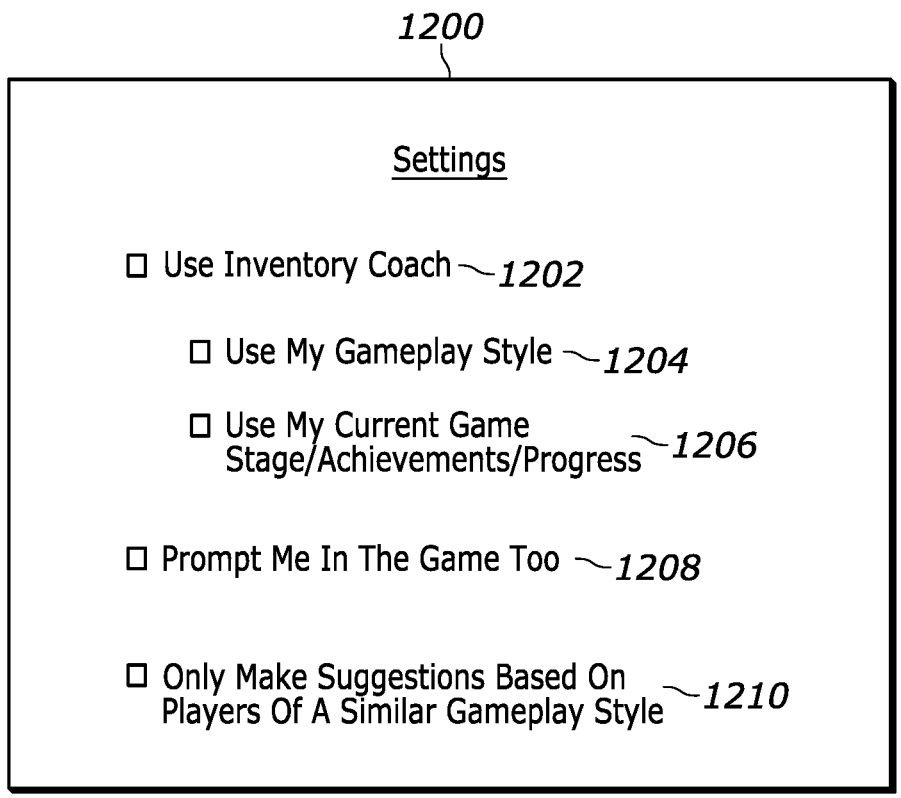
FIG. 12 shows an example settings GUI that may be presented to configure one or more settings of an inventory coach consistent with present principles.

Continuing the detailed description in reference to FIG. 12, it shows an example GUI 1200 that may be presented on a display controlled by a game console or other computer to configure one or more settings related to an inventory coach consistent with present principles. For example, the GUI 1200 may be presented responsive to selection of the selector 706 from the GUI 700 of FIG. 7. It is to be understood that in the example below, each option or sub-option may be selected by selecting the respective check box adjacent to the respective option or sub-option.

As shown in FIG. 12, the GUI 1200 may include a first option 1202 to set or enable the console to in the future use an inventory coach as described herein in order to make suggestions to a target player. Thus, the inventory coach may be turned on by selecting the option 1202 and turned off by deselecting the option 1202. The suggestions may be provided according to the GUIs described above as reached from the console's shell interface, though in some embodiments the suggestions and/or GUIs themselves may be presented responsive to a pause command while still within the game environment, from the game's own options menu, and/or as pop-up suggestions that are overlaid on the game's graphics while the player plays the game in real time. In fact, option 1208 may be selected to specifically set or configure the inventory coach to present suggestions mid-game while the player plays in real time either by indicating via an overlay graphic that suggestions are available and/or presenting non-fullscreen versions of the GUIs 900, 1000, and 1100 themselves.

FIG. 12 also shows that sub-options 1204 and 1206 may also be presented underneath the option 1202. Sub-option 1204 may be selected to set or configure the inventory coach to specifically use the target player's identified gameplay style when making suggestions, while sub-option 1206 may be selected to set or configure the inventory coach to specifically use the target player's current gamestate when making suggestions (e.g., currently reached stage or level of the game, achievements and progress already accomplished, etc.).

Additionally, if desired an option 1210 may be presented as part of the GUI 1200 for the target player to command the inventory coach to only present suggestions determined from the target player's identified gameplay style. Thus, should option 1210 be selected, suggestions derived from elite reference players generally (e.g., regardless of gameplay style as described above) may not be presented and only suggestions derived from reference players of a similar gameplay style may be presented.

Moving on from FIG. 12, note more generally that a given target player's assigned cluster for a given gameplay style may change as the player's own style changes or improves throughout playing a certain video game, and these changes may be recognized by the inventory coach. Thus, timestamps for various activities as indicated in game telemetry data may be used to identify such transitions in, e.g., role-playing games. For sporting games where each game or match within the video game itself (e.g., an eight-minute basketball or football game) might have a defined length, each discrete and separate game/match may be separately analyzed to determine a particular gameplay style for that particular game/match. Then if a target player is identified as moving out of one gameplay style cluster and into another one, future suggestions may be based on the new gameplay style cluster into which the target player is moving.

It will be appreciated that whilst present principals have been described with reference to some example embodiments, these are not intended to be limiting, and that various alternative arrangements may be used to implement the subject matter claimed herein.

What is claimed is:

1. A device, comprising:
at least one computer storage that is not a transitory signal and that comprises instructions executable by at least one processor to:
analyze, using an inventory coach model executing at a server, a video game player's playing style in relation to a particular video game that is being played by the video game player; and
communicate with the server to, based on the analysis performed using the inventory coach model executing at the server, provide, via a graphical user interface (GUI) presented on a display, at least two different types of suggestions of video game assets to discard, obtain, and/or use, the GUI providing a first suggestion indicating a first video game asset to discard, obtain, and/or use as determined based on past gameplay data for elite players that share the same playstyle as the video game player's playing style, the GUI providing a second suggestion indicating a second video game asset to discard, obtain, and/or use as determined based on past gameplay data for elite players from a broader class of players than those sharing the same playstyle as the video game player's playing style.

2. The device of claim 1, wherein the instructions are executable to:
use the inventory coach model and at least one reference player's data to make the first and second suggestions, the reference player being different from the video game player.

3. The device of claim 2, wherein the at least one reference player's data is assigned via the inventory coach model into a cluster defined by at least one common gameplay characteristic, the at least one common gameplay characteristic also identified as exhibited by the video game player while playing the particular video game.

4. The device of claim 1, wherein the first and second video game assets each comprise one or more of: a virtual weapon, virtual ammunition, virtual armor, a virtual craft, a virtual potion, a virtual plant.

5. The device of claim 1, wherein the suggestions are presented external to the video game environment itself.

6. The device of claim 1, wherein the first and second video game assets are different from each other.

7. The device of claim 1, wherein the broader class comprises elite players generally.

8. The device of claim 1, wherein the GUI is a first GUI, and wherein the instructions are executable to:
present a second GUI on the display, the second GUI being different from the first GUI, the second GUI comprising an option that is selectable to set the at least one processor to in the future provide suggestions, during gameplay, to the video game player based on the video game player's playing style.

9. The device of claim 1, wherein the GUI comprising the first and second suggestions is presented responsive to a pause command.

10. A method, comprising:
presenting a settings graphical user interface (GUI) on a display, the settings GUI establishing a first GUI, the settings GUI comprising an option that is selectable to set a device for in the future:
analyzing, at the device, a video game player's gameplay in relation to a particular video game that is being played by the video game player; and
based on the analysis, suggesting at least one video game asset to discard, obtain, and/or use;
wherein the analyzing and suggesting are performed by an inventory coach model executing at a server, the server establishing at least part of the device, the server communicating with a video game console to present the suggestion via a second GUI that is presented on the display.

11. The method of claim 10, wherein analysis of the video game player's gameplay comprises analysis of the video game player's combat style for engaging in video game combat.

12. The method of claim 10, wherein the video game console facilitates gameplay of the particular video game.

13. The method of claim 10, wherein the second GUI is presented external to the video game's environment.

14. The method of claim 10, wherein the video game player is a first video game player, and wherein the inventory coach model is trained through machine learning to tailor suggestions of video game assets based on the learned habits of a threshold number of other video game players besides the first video game player.

15. The method of claim 10, wherein the method comprises:

based on the analysis, providing, via the second GUI presented on the display, at least two different types of suggestions of video game assets to discard, obtain, and/or use, the second GUI providing a first suggestion indicating a first video game asset to discard, obtain, and/or use as determined based on past gameplay data for elite players that share the same playstyle as the video game player's playing style, the second GUI providing a second suggestion indicating a second video game asset to discard, obtain, and/or use as determined based on past gameplay data for elite players from a broader class of players than those sharing the same playstyle as the video game player's playing style.

16. The method of claim 10, comprising:
presenting the second GUI responsive to a pause command.

17. An assembly, comprising:
at least one computer comprising at least one processor programmed with instructions to:
identify a first video game player's collection of assets for a particular video game that is being played by the first video game player;
associate, using a machine learning model executing at a server, the first video game player with a cluster of other video game players; and
communicate with the server to, based on the association and responsive to receipt of a pause command to pause the particular video game, provide, via a graphical user interface (GUI) presented on a display, one or more suggestions of assets to discard and/or use, the one or more suggestions identified from the communication with the server to provide the one or more suggestions via the GUI, the assets being from the first video game player's collection of assets.

18. The assembly of claim 17, wherein the processor is programmed to:
associate the first video game player with the cluster based on the first video game player and members of the cluster having similar gameplay styles for playing the particular video game as determined by the machine learning model.

19. The assembly of claim 17, wherein the GUI is a first GUI, and wherein the at least one processor is programmed with instructions to:
present a second GUI on the display, the second GUI being different from the first GUI, the second GUI comprising an option that is selectable to set the at least one processor to in the future provide suggestions, during gameplay, of assets to discard and/or use.

20. The assembly of claim 17, wherein the GUI comprises:
a first suggestion indicating a first asset to discard and/or use as determined based on past gameplay data for elite players that share the same playstyle as the first video game player's playing style; and
a second suggestion indicating a second asset to discard and/or use as determined based on past gameplay data for elite players from a broader class of players than those sharing the same playstyle as the first video game player's playing style, the second suggestion being different from the first suggestion.

* * * * *